Patented Dec. 12, 1950

2,533,937

UNITED STATES PATENT OFFICE 2,533,937

METHOD OF PRODUCING HYDROGEN

Sven E. Hybinette and Francis C. Cary, Wilmington, Del.

No Drawing. Application August 11, 1947, Serial No. 768,076

1 Claim. (Cl. 23—214)

This invention relates to a new and improved method of producing hydrogen gas by the action of calcined dolomite, or lime, in the presence of water, on aluminum, and relates to our pending application, Serial Number 573,817, filed January 20, 1945, now abandoned, and to our applications titled "Method of Working Metals," "Method of Producing Metals" and "Method of Subdividing Metals," filed simultaneously herewith.

The object of this invention is the production of hydrogen, through the action of calcined dolomite, or lime, in the presence of water, on aluminum, by preparing a finely divided mixture, in the manner of combining molten aluminum with powdered calcined dolomite or lime.

Heretofore aluminum powder has been produced by such means as stamping, grinding, atomizing, or graining. The aluminum powder could then be mixed with calcined dolomite or lime, and with the addition of water, hydrogen was evolved. The thorough distribution of the aluminum powder is most desirable.

We have found a new method of combining the aluminum with calcined dolomite or lime that gives several beneficial results. We vigorously stir, and mix molten aluminum with finely ground calcined dolomite or lime. This may be done in an iron vessel or other suitable container.

The procedure may be accomplished by one of the following, or other suitable methods: 1, pouring molten aluminum into the calcined dolomite or lime powder heated above the melting point of aluminum and combining as above; 2, by adding the calcined dolomite or lime powder heated above the melting point of aluminum to molten aluminum and combining as above; 3, the preferred method of combining solid aluminum with calcined dolomite or lime powder, heating the mixture to melt the aluminum and combining as above.

After employing one of the above, or other suitable, procedures, and after cooling the resulting mass, screening will reveal that the larger size particles consist of a very intimate mixture held together by the aluminum. Calcined dolomite or lime particles appear to have been forced into the aluminum, which in turn is covered by said particles. Chemical analysis of the fines reveals that they contain aluminum. The more the mix is stirred to completion the higher the aluminum content of the fines and the fewer the larger size particles. After thorough stirring the aluminum is finely and uniformly dispersed in the mass.

The aluminum oxidizes but little during this treatment, probably because it is protected by the calcined dolomite or lime, more than would be expected.

This procedure has also been accomplished under vacuum or in the presence of an inert atmosphere which keeps oxidation to a minimum, as well as the formation of the nitride or carbide under conditions where these two compounds might otherwise be formed.

The residue resulting from the hydrogen forming reaction with lime will consist of calcium aluminate, one of the constituents of a cement mix. Therefore the residue should be used with an inorganic cement for the production of concrete. By compositioning either the calcined dolomite or lime mix with an excess of lime the residue from the reaction is a plaster and should be so employed.

The apparatus needed for this procedure is inexpensive and simple, and the procedure can, of course, be carried out in many different ways.

Aluminum shavings and borings are usually the cheapest form of the metal. Aluminum in any other form may be used, and this application is intended to cover all such forms of aluminum, scrap or of virgin grade.

We claim:

In the production of hydrogen the steps of stirring and mixing molten aluminum with finely divided calcined dolomite heated above the melting point of aluminum, reacting the resulting mix with water after cooling, and collecting said hydrogen evolved.

SVEN E. HYBINETTE.
FRANCIS C. CARY.

REFERENCES CITED

The following references are of record in the file of this patent:

Mellor's "Modern Inorganic Chemistry," Revised ed., 1939, page 668, Longmans, Green & Co., N. Y.

J. W. Mellor's "A Comprehensive Treatise on Inorganic and Theoretical Chemistry," vol. 3, 1923 ed., pp. 663, 665; vol. 5, 1924 ed., pp. 203, 205, 207. Longmans, Green & Co., N. Y.

"Handbook of Chemistry and Physics," 28th ed., by C. D. Hodgman, pp. 358-9. Published by Chemical Rubber Publishing Co., Cleveland, Ohio.